United States Patent
Basso et al.

(10) Patent No.: US 9,473,502 B2
(45) Date of Patent: *Oct. 18, 2016

(54) ATOMICALLY UPDATING TERNARY CONTENT ADDRESSABLE MEMORY-BASED ACCESS CONTROL LISTS

(71) Applicant: International Business Machines Corporation, Armonk, NY (US)

(72) Inventors: Claude Basso, Nice (FR); Joseph A. Kirscht, Rochester, MN (US); Natarajan Vaidhyanathan, Carrboro, NC (US); Colin B. Verrilli, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/520,008

(22) Filed: Oct. 21, 2014

(65) Prior Publication Data
US 2015/0341364 A1  Nov. 26, 2015

Related U.S. Application Data

(63) Continuation of application No. 14/284,788, filed on May 22, 2014.

(51) Int. Cl.
*H04L 29/06* (2006.01)
*H04L 12/743* (2013.01)
*G06F 12/12* (2016.01)
*H04L 12/54* (2013.01)
(Continued)

(52) U.S. Cl.
CPC .............. *H04L 63/101* (2013.01); *G06F 12/12* (2013.01); *G06F 12/121* (2013.01); *G06F 17/30* (2013.01); *G06F 17/30982* (2013.01); *H04L 12/54* (2013.01); *H04L 12/5689* (2013.01); *H04L 45/00* (2013.01); *H04L 45/7457* (2013.01); *H04L 63/102* (2013.01); *G06F 2212/69* (2013.01)

(58) Field of Classification Search
CPC ............. H04L 45/7457; H04L 63/101; H04L 12/4641; H04L 45/38; H04L 12/5689; H04L 45/00; H04L 63/102; G06F 15/16; G06F 12/121; G06F 17/30; G06F 17/30982; G06F 2212/69
See application file for complete search history.

(56) References Cited

U.S. PATENT DOCUMENTS 7,304,996 B1   12/2007  Swenson et al.
7,451,267 B1 * 11/2008  Venkatachary ........ G11C 15/00
                                                    711/103

(Continued)

OTHER PUBLICATIONS

U.S. Appl. No. 14/284,788, filed May 22, 2014.
(Continued)

*Primary Examiner* — Hashem Farrokh
(74) *Attorney, Agent, or Firm* — Patterson + Sheridan, LLP (57) ABSTRACT

Embodiments described herein provide techniques for atomically updating a ternary content addressable memory (TCAM)-based access control list (ACL). According to one embodiment, a current version bit of the ACL is determined. The current version bit indicates that a rule in the ACL is active is the version flag in the rule matches the current version bit. Through these techniques, a first set of rules can be modified to create a second set of rules (e.g., by insertions, deletions, and replacements, etc.).

7 Claims, 9 Drawing Sheets

(51) Int. Cl.
*G06F 17/30* (2006.01)
*H04L 12/701* (2013.01)

(56) References Cited

U.S. PATENT DOCUMENTS

| | | |
|---|---|---|
| 7,552,275 B1 | 6/2009 | Krishnan |
| 8,358,651 B1 | 1/2013 | Kadosh et al. |
| 8,553,582 B1 | 10/2013 | Mizrahi et al. |
| 8,873,392 B1 | 10/2014 | Orr |
| 2003/0198231 A1 | 10/2003 | Kalkunte et al. |
| 2005/0114657 A1 | 5/2005 | Kumar et al. |
| 2005/0220092 A1 | 10/2005 | LaVigne et al. |
| 2006/0156018 A1* | 7/2006 | Lauer ............... G06F 21/6218 713/182 |
| 2007/0022479 A1 | 1/2007 | Sikdar et al. |
| 2010/0020814 A1 | 1/2010 | Thyni |
| 2011/0161580 A1* | 6/2011 | Shah ................. H04L 49/10 711/108 |
| 2013/0034100 A1 | 2/2013 | Goyal et al. |
| 2013/0218853 A1 | 8/2013 | Bullis et al. |
| 2014/0119177 A1 | 5/2014 | Delregno et al. |
| 2015/0006808 A1 | 1/2015 | Miller et al. |
| 2015/0341269 A1 | 11/2015 | Basso et al. |
| 2015/0341270 A1 | 11/2015 | Basso et al. |
| 2015/0341316 A1 | 11/2015 | Basso et al. |
| 2015/0341364 A1 | 11/2015 | Basso et al. |
| 2015/0341365 A1 | 11/2015 | Basso et al. |
| 2015/0358244 A1 | 12/2015 | Basso et al. |
| 2015/0358245 A1 | 12/2015 | Basso et al. |

OTHER PUBLICATIONS

U.S. Appl. No. 14/284,788, entitled "Atomically Updating Ternary Content Addressable Memory-Based Access Control Lists", filed May 22, 2014.

U.S. Appl. No. 14/284,811, entitled "Supporting Access Control List Rules Apply to TCP Segments Belonging to 'Established' Connection", filed May 22, 2014.

U.S. Appl. No. 14/284,859, entitled "Access Control List-Based Port Mirroring Techniques", filed May 22, 2014.

U.S. Appl. No. 14/284,927, entitled "Skipping and Parsing Internet Protocol Version 6 Extension Headers to Reach Upper Layer Headers", filed May 22, 2014.

U.S. Appl. No. 14/296,574, entitled "Unified Framework for Isolating Multicast and Broadcast Frames to a Traffic Class Separate From a Traffic Class Used for Unicast Frames", filed Jun. 5, 2014.

* cited by examiner

ATOMICALLY UPDATING TERNARY CONTENT ADDRESSABLE MEMORY-BASED ACCESS CONTROL LISTS

CROSS-REFERENCE TO RELATED APPLICATION

This application is a continuation of co-pending U.S. patent application Ser. No. 14/284,788, filed May 22, 2014.

BACKGROUND

In computer networking, an access control list (ACL) can refer to a strictly ordered list of rules applied to port numbers or IP addresses available on a host or other network. An ACL may be implemented on networking devices, such as routers and switches, to filter traffic and provide network security. For instance, an ACL may include rules that specify certain network hosts or addresses that a switch should permit or deny access.

An ACL rule may be divided into a condition and an action. That is, if a certain condition is satisfied, then the networking device performs the corresponding action. For example, a rule may specify, as a condition, receiving an incoming frame from a certain IP address. The rule specifies, as a corresponding action, to discard the frame. Typically, networking devices configured with ACLs execute an action associated with the first matching rule in the list. Therefore, the ordering of the list is of importance.

An ACL may be implemented in a networking device using ternary content addressable memory (TCAM). TCAM is a type of computer memory that allows for high speed searching in the ACL. In a basic content addressable memory (CAM) table, data is accessed by providing content to be searched, commonly referred to as a search key (as opposed to a memory address, in the case of other types of memory). During a search operation, a CAM performs a strict compare of binary values of the search key (i.e., 0 or 1) with the binary values stored in every row of the CAM to obtain one or more location(s) containing matching data. In contrast, each position within a TCAM is formed with a two bit encode, providing 4 combinations: 0, 1, Always Match ("wildcard" or "don't care"), and Never Match. During a search operation, a TCAM performs a compare of the binary values of the search key with the two bit encodes stored in every row of the TCAM. As a result, using a TCAM provides more flexibility than a CAM.

A networking device may store rule conditions in a TCAM table and rule actions in an addressable array structure, such as a static random-access memory (SRAM) table. When the device matches a condition in the TCAM, the TCAM provides a memory address of the corresponding action in the SRAM.

SUMMARY

Embodiments presented herein provide a method for atomically updating an access control list stored in a ternary content addressable memory (TCAM). The method generally includes receiving an update to apply to the access control list. The method also includes identifying a first group of entries in the TCAM using an active version bit. Each entry in the first group has a ternary flag has a value matching a current value of the active version bit. The ternary flag value indicates one of matching, not matching, or always matching the active version bit. The method also includes updating the ternary flag value of one or more entries in the TCAM to define a second group of entries. Each entry in the second group of entries has ternary flag value of either not matching or always matching. The method includes atomically performing the update by inverting the value of the active version bit.

Another embodiment includes a computer program product, itself comprising a computer-readable storage medium having computer-readable program code embodied therewith, the computer-readable program code configured to perform an operation for atomically updating an access control list stored in a TCAM. The operation generally includes receiving an update to apply to the access control list. The operation also includes identifying a first group of entries in the TCAM using an active version bit. Each entry in the first group has a ternary flag has a value matching a current value of the active version bit. The ternary flag value indicates one of matching, not matching, or always matching the active version bit. The operation also includes updating the ternary flag value of one or more entries in the TCAM to define a second group of entries. Each entry in the second group of entries has ternary flag value of either not matching or always matching. The operation includes atomically performing the update by inverting the value of the active version bit.

Still another embodiment includes a processor and a memory storing a program, which, when executed on the processor, performs an operation for atomically updating an access control list stored in a TCAM. The operation generally includes receiving an update to apply to the access control list. The operation also includes identifying a first group of entries in the TCAM using an active version bit. Each entry in the first group has a ternary flag has a value matching a current value of the active version bit. The ternary flag value indicates one of matching, not matching, or always matching the active version bit. The operation also includes updating the ternary flag value of one or more entries in the TCAM to define a second group of entries. Each entry in the second group of entries has ternary flag value of either not matching or always matching. The operation includes atomically performing the update by inverting the value of the active version bit.

DETAILED DESCRIPTION

An access control list (ACL) implemented in a networking device using a ternary content addressable memory (TCAM) may be modified to suit the needs of a network. However, updates to the ACL need to be atomic and should not disrupt network traffic being processed. Because rules should all become effective at the same time, frames processed by the network device should not be processed using only a subset of rules.

Current methods of updating an ACL include creating a new rule group in an equivalent hardware structure that includes the same rules as the currently active rule group as well as any new rules (e.g., or, in the case of a deletion, the same rules as the currently active rule group minus any rules to be discarded). The new rule group remains inactive until needed. In such an event, the device deactivates the old ACL rule group and activates the new rule group. However, one drawback to this approach is that it requires two times the chip area actually used during functional operation (i.e., one hardware structure holds the rules for the currently active rule group while the equivalent hardware structure is unused functionally). Additionally, this approach does not offer much granularity. In other words, updates are applied by creating another rule group to replace the current rule group. If multiple rule groups in a network are to be updated, this approach requires many additional rule groups. Because network devices might not have the capacity to accommodate many additional rule groups, this approach may be ineffective.

Embodiments disclosed herein provide techniques for atomically updating a ternary content addressable memory (TCAM)-based access control list in a networking device. In one embodiment, each condition entry in a TCAM table includes a version flag that includes a current version of the ACL rule. Because the version flag is ternary, the flag may be set to a wildcard value (e.g., represented by an asterisk, "*") to match either version value (i.e., a 0 or a 1). During a lookup, the device generates a search key that specifies the current version bit in a version field of the search key. As a result, only rules matching the current version are included in search results. Doing so allows updated rules (e.g., inserted rules, deleted rules, etc.) to have a version different from the current version without affecting the search results. The version flag being ternary allows the ACL to be updated atomically at the granularity of an individual rule.

Note, the following description relies on a distributed network switch as a reference example of a networking device that updates a TCAM-based access control list using the disclosed techniques. However, one of skill in the art will recognize that techniques are applicable in other contexts related to updating an access control list implemented using a TCAM table. For example, the techniques may also generally be adapted to other networking devices that maintain an access control list in TCAM. Further, the following description uses a static random-access memory (SRAM) table as a reference example for a structure that stores corresponding actions of a TCAM-based access control list. However, any addressable array structure (e.g., a Register Array, Register, File, an EDRAM, and the like) may be used to store such actions.

Figure 1:
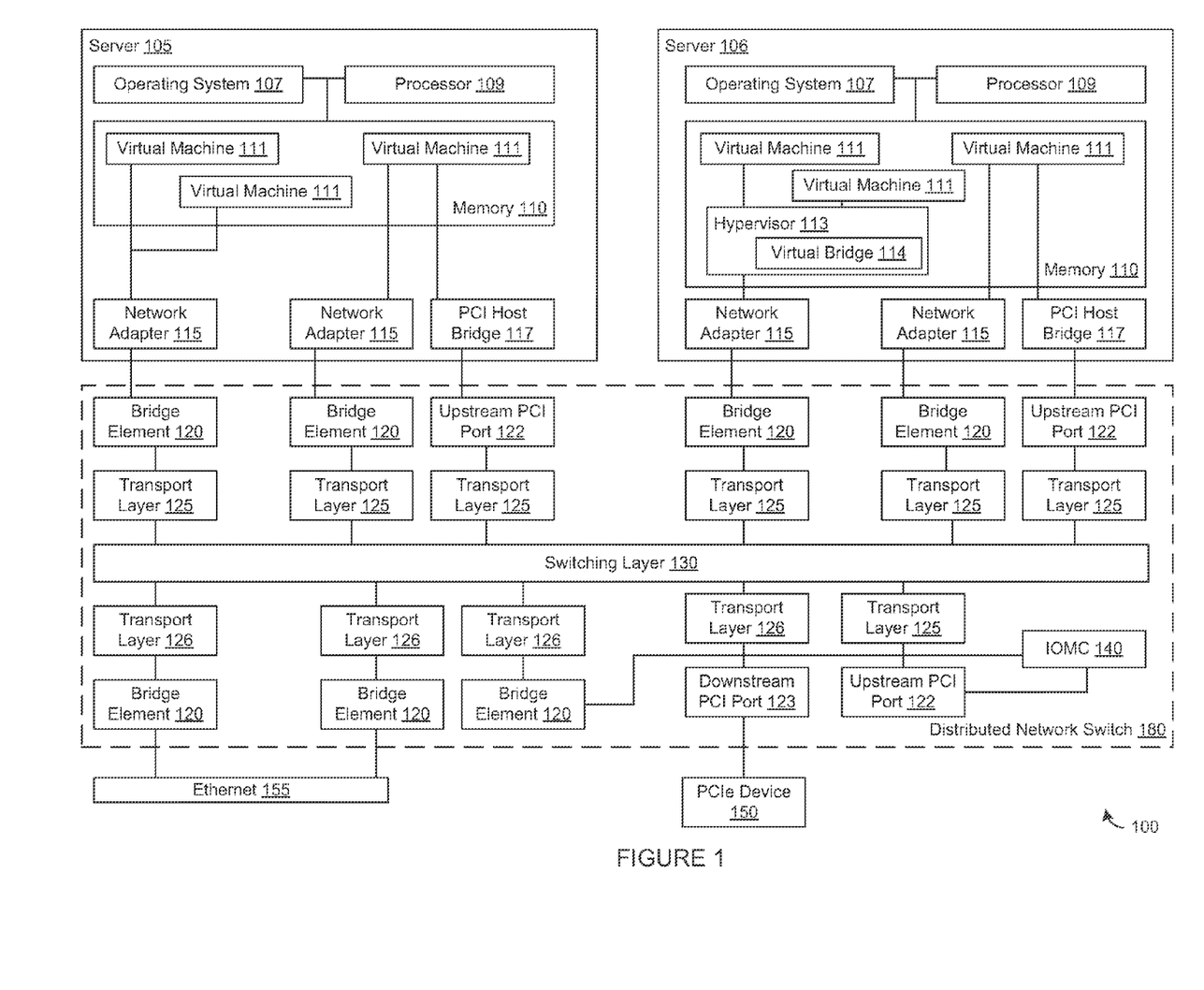
FIG. 1 illustrates a system architecture that includes a distributed network switch, according to one embodiment.

FIG. 1 illustrates a system architecture 100 that includes a distributed network switch, according to one embodiment disclosed herein. The first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may include memory storage physically located in the server 105 or on another computing device coupled to the server 105.

The server 105 may operate under the control of an operating system 107 and execute various computer software applications, components, programs, objects, modules, and data structures, such as virtual machines 111.

The server 105 may include network adapters 115 (e.g., converged network adapters, or CNAs). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement a Fiber Channel over Ethernet (FCoE) protocol, RDMA over Ethernet, Internet small computer system interface (iSCSI), and the like. In general, a network adapter 115 transfers data using both an Ethernet and PCI based communication method and may be coupled to one or more of the virtual machines 111. In particular, Ethernet may be used as the protocol to the switch fabric, while PCI may be used as the protocol to transfer data to/from main memory to the network adapter 115. Additionally, the adapters may facilitate shared access between the virtual machines 111. While the adapters 115 are shown as being included within the server 105, in other embodiments, the adapters may be physically distinct devices that are separate from the server 105.

Each network adapter 115 may include one or more Ethernet ports that couple to one of the bridge elements 120. Additionally, to facilitate PCIe communication, the server may have a PCI Host Bridge 117. The PCI Host Bridge would then connect to an upstream PCI port 122 on a switch element in the distributed network switch 180. The data is then routed via the switching layer 130 to the correct downstream PCI port 123 which may be located on the same or different switch module as the upstream PCI port 122. The data may then be forwarded to the PCI device 150.

The bridge elements 120 may be configured to forward data frames throughout the distributed network switch 180. For example, a network adapter 115 and bridge element 120 may be connected using two 40 Gbit Ethernet connections or one 100 Gbit Ethernet connection. The bridge elements 120 forward the data frames transmitted by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed network switch 180.

Further, in one embodiment, the bridge elements 120 include a ternary content addressable memory (TCAM) table and an addressable array structure, such as a static random-access memory (SRAM) table, which collectively provide an access control list (ACL). The ACL maintains a list of rules that the bridge elements 120 apply in managing data frames processed within the distributed network switch 180. The TCAM table stores a condition for each rule. And the SRAM stores an action performed when a corresponding rule condition is met.

The distributed network switch 180, in general, includes a plurality of bridge elements 120 that may be located on a plurality of a separate, though interconnected, hardware components. To the perspective of the network adapters 115, the distributed network switch 180 acts like one single switch even though the distributed network switch 180 may be composed of multiple switches that are physically located on different components. Distributing the network switch 180 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the distributed network switch 180 are compatible with at least two different communication protocols—e.g., the Ethernet and PCIe communication standards. That is, at least one switch module has the necessary logic to transfer different types of data on the same switching layer 130.

A second server 106 may include a processor 109 connected to an operating system 107 and memory 110 which includes one or more virtual machines 111 similar to those found in the first server 105. The memory 110 of server 106 also includes a hypervisor 113 with a virtual bridge 114. The hypervisor 113 manages data shared between different virtual machines 111. Specifically, the virtual bridge 114 allows direct communication between connected virtual machines 111 rather than requiring the virtual machines 111 to use the bridge elements 120 or switching layer 130 to transmit data to other virtual machines 111 communicatively coupled to the hypervisor 113.

An Input/Output Management Controller (IOMC) 140 (i.e., a special purpose processor) is coupled to at least one bridge element 120 which provides the IOMC 140 with access to the switching layer 130. One function of the IOMC 140 may be to receive commands from an administrator to configure the different hardware elements of the distributed network switch 180. In one embodiment, these commands may be received from a separate switching network from the switching layer 130. Although one IOMC 140 is shown, the system 100 may include a plurality of IOMCs 140. In one embodiment, the IOMCs 140 may be arranged in a hierarchy such that one IOMC 140 is chosen as a master while the others are delegated as members.

Figure 2:
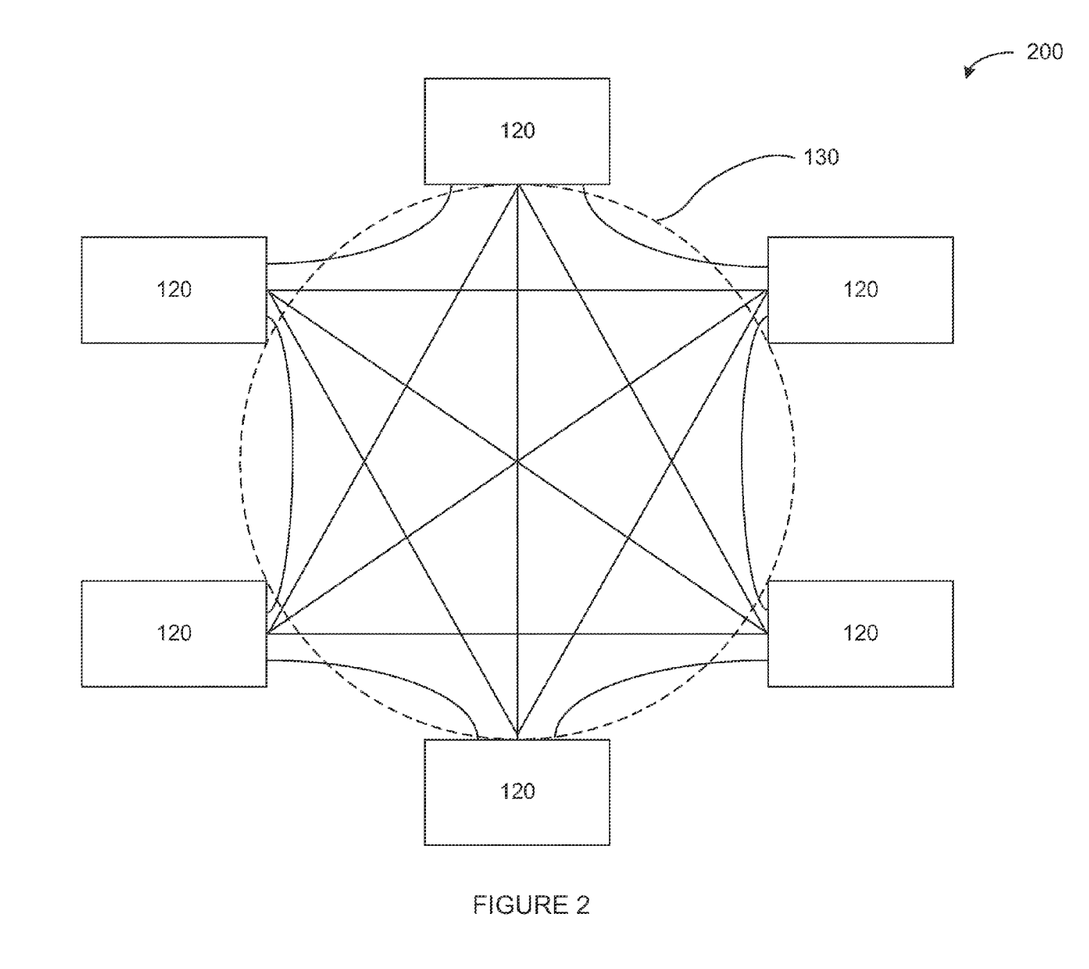
FIG. 2 illustrates components of a distributed network switch, according to one embodiment.

FIG. 2 illustrates a virtual switching layer, according to one embodiment. Each bridging element 120 in the system 100 is connected to each other using the switching layer 130 via a mesh connection schema. That is, no matter the bridging element 120 used, a cell (i.e., data packet) can be routed to another bridging element 120 located on any other switch module. This may be accomplished by directly connecting each bridging element 120—i.e., each bridging element 120 has a dedicated data path to every other bridging element 120.

In one embodiment, each switch module is operatively connected to multiple bridge elements. In a particular embodiment, each switch module is configured to use five bridge elements, where each bridge element is a distributed Virtual Ethernet Bridge (dVEB) that supports data transfer rates of one hundred gigabits per second (100 Gbps). The dVEBs are managed by firmware executing on the management controller.

Figure 3:
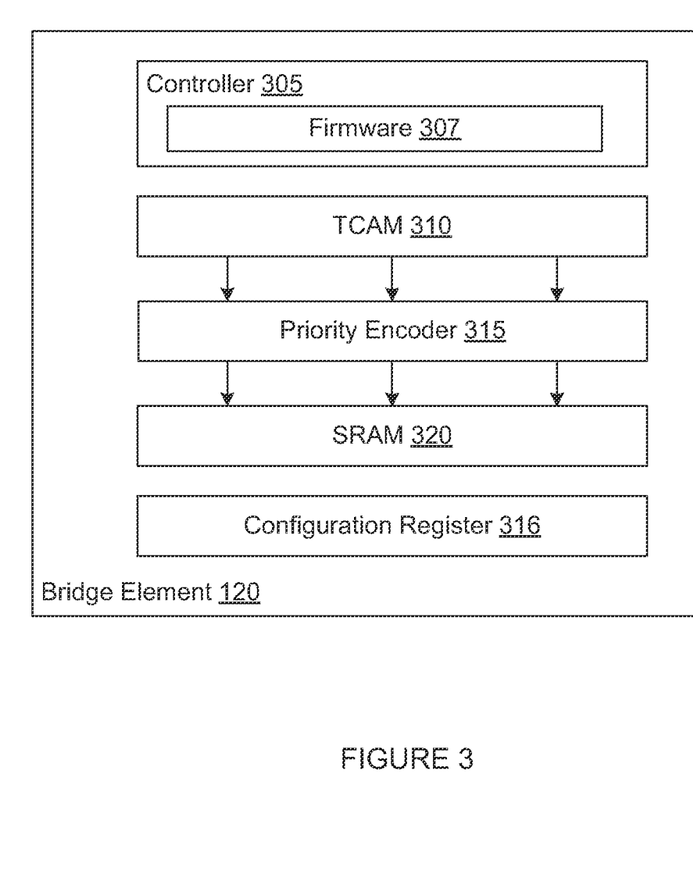
FIG. 3 illustrates components of a bridge element, according to one embodiment.

In one embodiment, each individual bridge element 120 manages its own ACL using a TCAM and an SRAM residing within the bridge element 120. An example bridge element 120 is further shown in FIG. 3. More specifically, FIG. 3 illustrates a bridge element 120 that is configured to atomically update access control lists maintained on the bridge element 120, according to one embodiment. As shown, the bridge element 120 includes a controller 305, a TCAM 310, a priority encoder 315, and an SRAM 320. The controller 305 includes firmware 307. The firmware 307 provides various modules for managing aspects of the bridge element 120, such as ACLs maintained in the bridge element 120.

The TCAM 310 provides a rule table that stores conditions of the ACL based on rule priority. Each entry in the table provides a condition and address data used to determine the location of a corresponding rule action stored in the SRAM 320. When the bridge element 120 receives an incoming frame, the controller 305 iterates through the ACL, beginning from the highest priority (and active) rule to determine if any condition matches the frame. For example, the rule may match various properties to an incoming frame, such as a service IP address, a source/destination IP address, and the like. When properties of a frame match one or more of the conditions in the TCAM 310, the TCAM 310 outputs a bit vector of length equal to a number of rows in the TCAM 310. For the rows of the TCAM 310 that matched the properties of the frame, the corresponding bits within the vector are active, with all others being inactive. The priority encoder 315 receives the bit vector from the TCAM 310, selects the one having the highest priority, encodes the position to an address, and applies the address to the SRAM 320 to retrieve the corresponding action.

In addition, each rule condition entry in the table 312 includes a ternary version bit field. The configuration register 322 provides a current version bit that the bridge element 120 uses to determine which rules in the ACL are active. That is, if the version bit of a rule matches the current version bit of the configuration register 322, then the rule is considered active. Conversely, if the version bit of the rule is the opposite of the current version bit of the configuration register 322, then the rule is considered inactive. However, the version bit within the rule may be set to a wildcard bit value. The wildcard value indicates "always match." In other words, if the version bit of a given rule condition entry is set to a wildcard bit value, the rule is considered active, regardless of the value of the current version bit in the configuration register 322.

Figure 4:
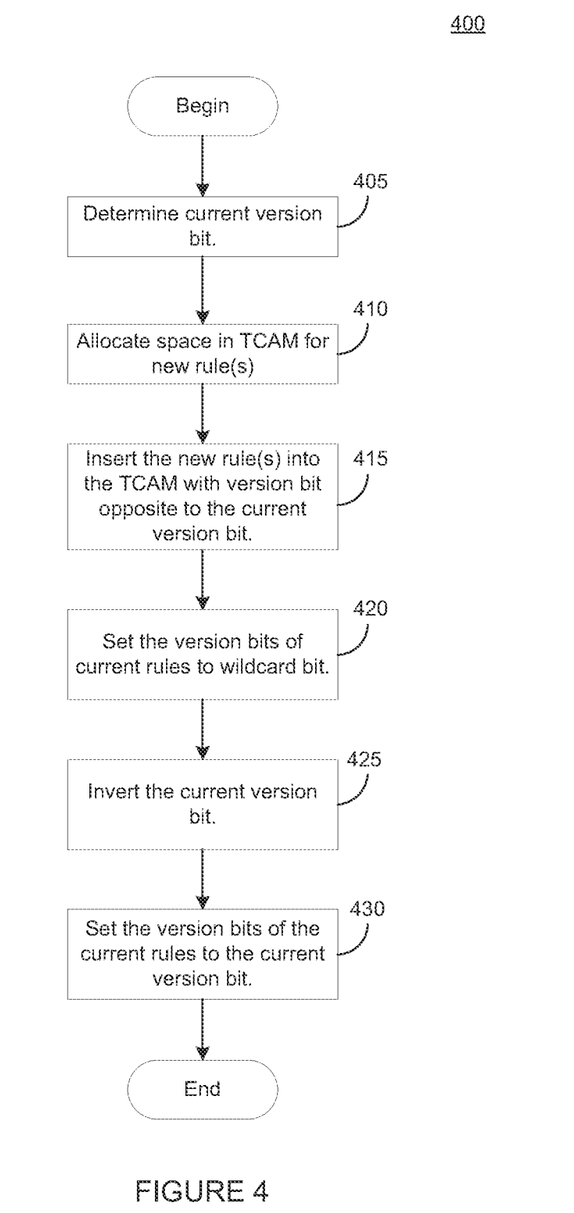
FIG. 4 illustrates a method for inserting a new rule into an access control list, according to one embodiment.

FIG. 4 illustrates a method 400 for inserting one or more rules into an ACL, according to one embodiment. Method 400 begins at step 405, where the controller determines the current version bit of the rules in the ACL. As stated, the current version bit information is provided in the configuration register 316. As an example, assume that the current version bit of the rules in the ACL is set to 0. At step 410, the controller allocates space in the TCAM to accommodate the new rules. The controller may perform table expansion and/or shuffle operations to do so. For example, assume that rules currently in the TCAM are stacked tightly. As a result, the controller copies rules from a lower address to a higher address to "bubble" the rules toward the lower address where a given new rule is to be inserted. At step 415, the controller inserts the new rules into the table 312 with the version bit opposite to the current version bit. To do so, the controller 305 may perform multiple store operations to position the new rules at an appropriate placement in the table 312. In parallel, the controller performs multiple store operations to the SRAM table to store corresponding rule actions. Continuing the previous example, new rules added to the TCAM has a version bit of 1. Because the new rules each have a version bit that differs from the current version bit set in the configuration register 316, the new rules are inactive.

At step 420, the controller sets the version bit of each of the current rules to a wildcard bit value. As stated, the wildcard bit value in a TCAM provides a "don't care" matching state. More specifically, wildcard bits can be matched to either a 0 or a 1 value. Advantageously, the current rules remain active and undisrupted regardless of the current version bit value set in the configuration register 316.

At step 425, the controller inverts the current version bit in the configuration register 316. By doing so, the current version bit matches the version bit of the new rule conditions in the TCAM. Consequently, the new rules become active while the rules from the current set remain active (due to the wildcard match). At step 430, the controller sets the version bit of each current rule to the current version bit set in the configuration register 316. To do so, the controller may iterate through the TCAM and identify entries having a version bit set to a wildcard. If the version bit is set to a wildcard, then the controller sets the bit to the current version bit, completing the update.

Figure 5:
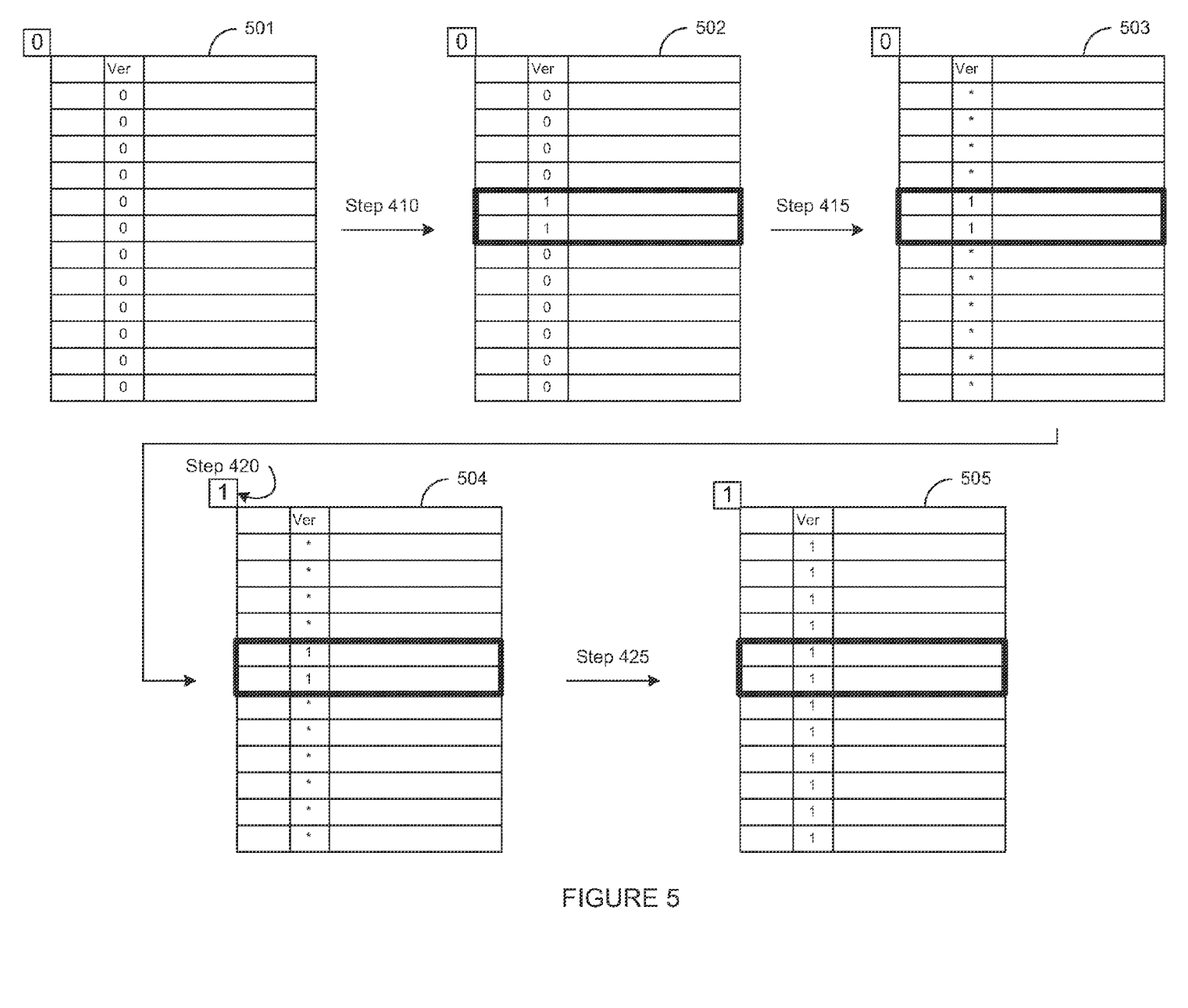
FIG. 5 illustrates an example flow for inserting a new rule into an access control list, according to one embodiment.

FIG. 5 illustrates some steps of method 400 in inserting two additional rules to an ACL. Boxes 501-505 represent the TCAM table iteratively as steps of method 400 are being performed. For simplicity, FIG. 5 displays only the version bit of each rule condition in the TCAM table. Further, a small box on the upper left corner of each of Boxes 501-505 represents the current version bit value in the configuration register 316.

Box 501 depicts an initial state of the TCAM table. The TCAM table is populated with multiple rule conditions. Box 502 depicts the TCAM table after two new rule conditions are inserted (illustrated by the bold rectangle). Note that the version bits of the new rule conditions are set as 1, while the version bits of the current rules are 0. Box 503 depicts the TCAM table after the version bits of the current rules have been set to wildcard bit values, where the wildcard bit is represented by an asterisk (*). Box 504 depicts the TCAM table after the current version bit in the configuration register 316 is inverted. As shown, the current version bit value is now 1. Box 505 depicts the TCAM table after the version bits of the current rules have been set to match the new rules. As shown, each rule in the TCAM table has a version bit value of 1.

Figure 6:
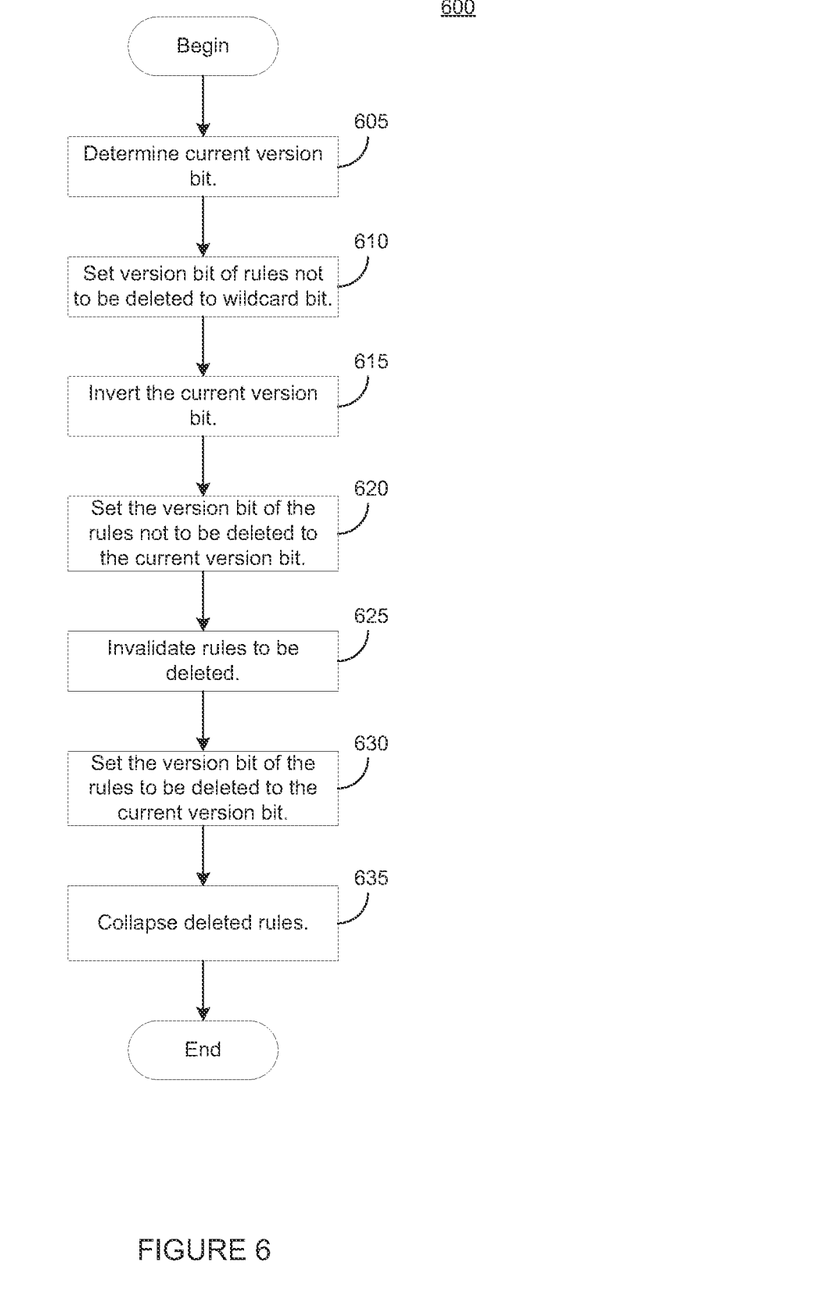
FIG. 6 illustrates a method for deleting a rule from an access control list, according to one embodiment.

FIG. 6 illustrates a method 600 for deleting a rule from an ACL, according to one embodiment. Method 600 begins at step 605, where the controller determines a value of the current version bit set in the configuration register 316.

At step 610, the controller sets the version bit of each rule not to be deleted to a wildcard value. At step 615, the controller inverts the current version bit set in the configuration register 316. Note, even if the current version bit is inverted, the rules that are not to be deleted remain active because the version bit of each of the rules is set to the wildcard bit. Conversely, the rules that are to be deleted are disabled when the current version bit in the configuration register 316 is inverted.

At step 620, the controller sets the version bit each of the rules not to be deleted (i.e., the rules that have a version bit set to the wildcard bit) to the current version bit. At step 625, the controller invalidates rules to be deleted. To do so, the controller may set a bit that indicates whether the rule is valid or invalid to 0 (or simply change one or more encodes in the row to "Never Match.") At step 630, the controller sets the version bit of the rules to be deleted to the current version bit. Previously invalidating the rules prevents any reuse of the rules from occurring when inserting any new rules to the ACL. Further, at step 635, the controller may optionally collapse the invalidated rules.

Figure 7:
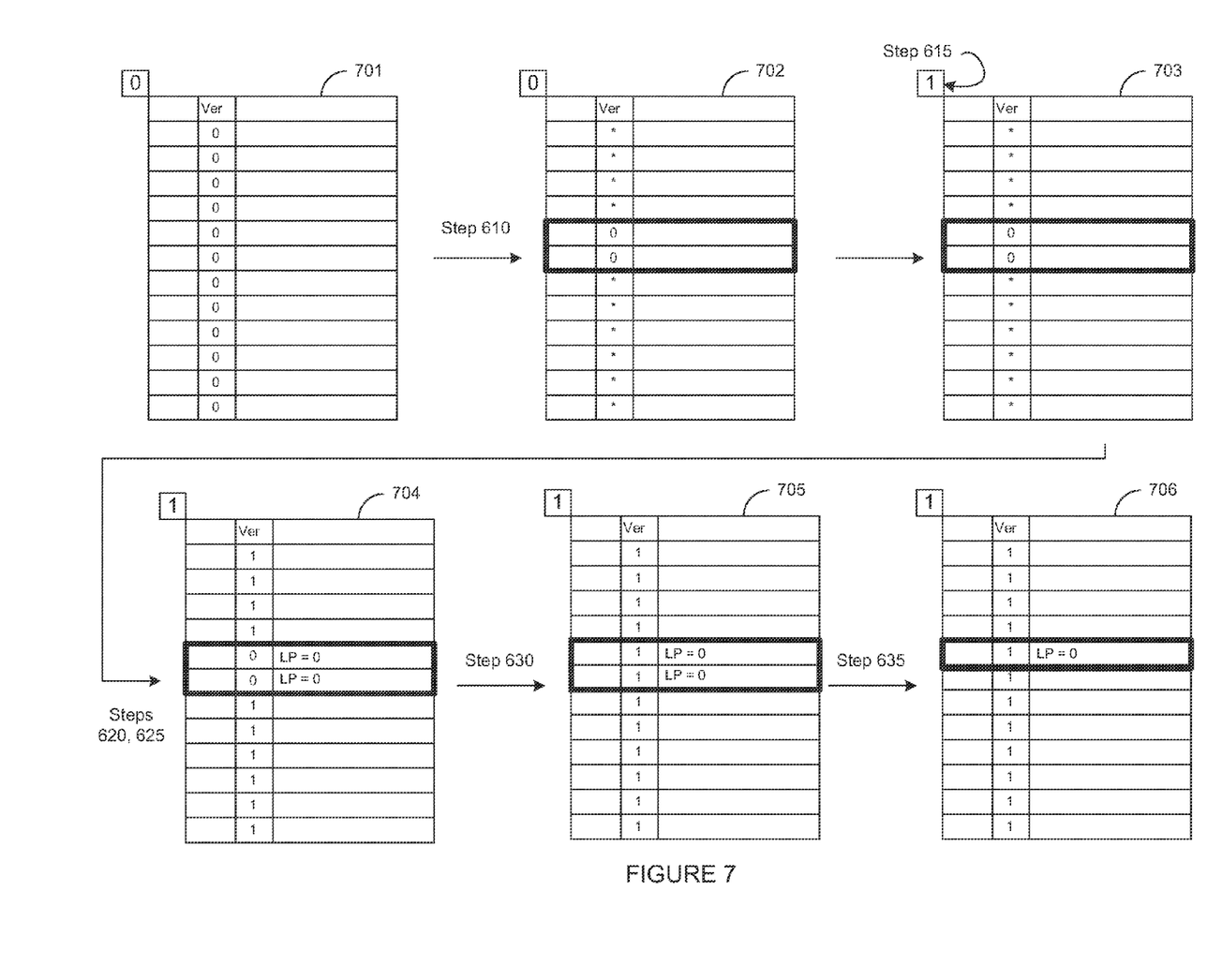
FIG. 7 illustrates a flow for deleting a rule from an access control list, according to one embodiment.

FIG. 7 illustrates an example of method 600 performed to delete rules from an ACL, according to one embodiment. Boxes 701-705 represent the TCAM table iteratively as steps of method 600 are being performed. Further, a box on the upper left corner of each of Boxes 701-705 represents the current bit value in the configuration register. Box 701 illustrates an initial state of the TCAM table. The TCAM table is populated with multiple rule conditions. Box 702 depicts the TCAM table after all rules that are not to be deleted are set to a wildcard bit value, where the wildcard bit is represented by an asterisk (*). Note, the rules to be deleted are highlighted with a bold rectangle. Box 703 depicts the TCAM table after the current version bit in the configuration register 316 has been inverted. Box 704 depicts the TCAM table after the version bits of the rules not to be deleted have been set to match the current version bit. In addition, Box 704 also depicts the rules to be deleted being invalidated by setting a validity bit field LP to 0. Alternatively, the rules may be invalidated by changing any one or more encodes in the row to "Never Match." Doing so in place of using a validity bit provides one extra bit to use for other data comparisons. Box 705 depicts the TCAM table after the version bit of the invalidated rules has been set to match the current version bit. Box 706 depicts the optional step of collapsing invalid rules into one position in the TCAM table.

Figure 8:
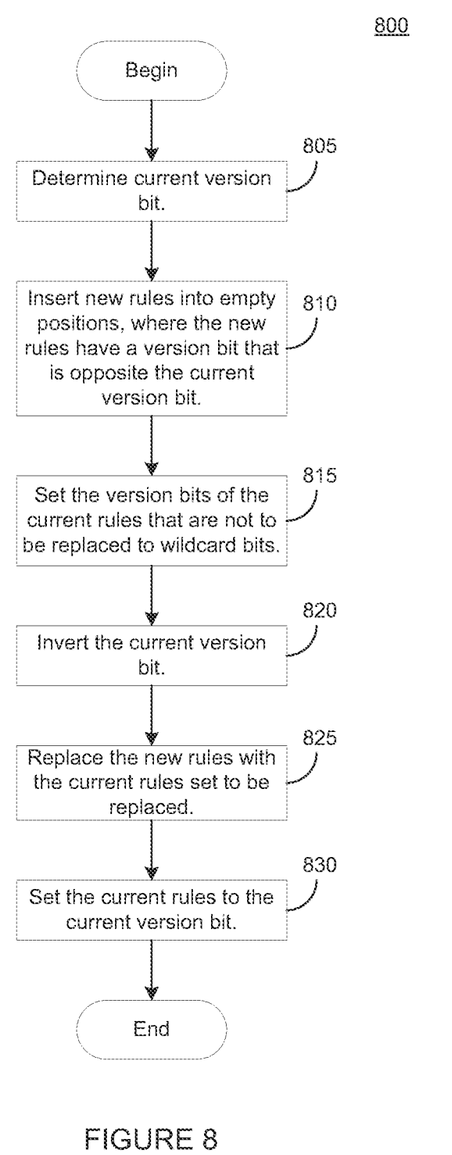
FIG. 8 illustrates a method for replacing a rule in an access control list, according to one embodiment.

FIG. 8 illustrates a method 800 for replacing a rule in an ACL, according to one embodiment. As an example, assume that two rules in the ACL are to be replaced. Further assume that the two rules are adjacent to one another. Method 800 begins at step 805, where the controller determines the current version bit in the configuration register.

At step 810, the controller inserts new rules into empty positions of the TCAM. The new rules should have a version bit that is opposite to the current version bit set in the configuration register. Continuing the previous example, assume that the current version bit is set to 0. In this case, the new rules inserted should have a version bit of 1.

At step 815, the controller sets the version bits of the current rules that are not to be replaced to wildcard bits. At step 820, the controller inverts the current version bit in the configuration register. Doing so renders the rules to be replaced as inactive while simultaneously rendering the new rules as active.

At step 825, the controller places the new rules into the position of the current rules set to be replaced. At step 830, the controller sets the remaining current rules (i.e., the rules having a version bit previously set to the wildcard bit) to the current version bit set in the configuration register.

Figure 9:
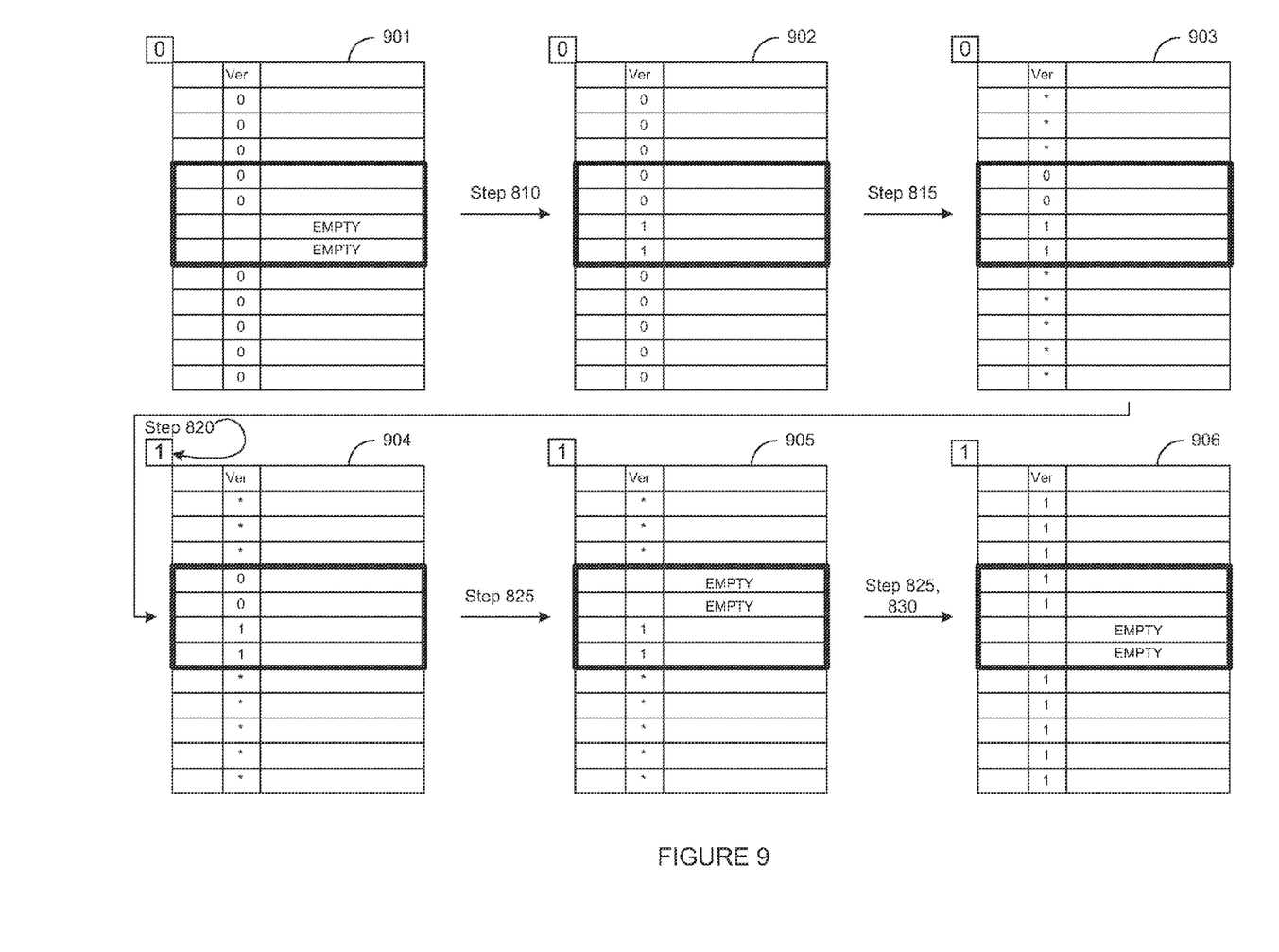
FIG. 9 illustrates a flow for replacing a rule in an access control list, according to one embodiment.

FIG. 9 illustrates the steps of method 800 in replacing rules in an ACL. Boxes 901-906 represent the TCAM table iteratively as steps of method 800 are being performed. For simplicity, FIG. 9 displays only the version bit of each rule condition in the TCAM table. Further, a small box on the upper left corner of each of Boxes 901-906 represents the current version bit value in the configuration register.

Box 901 depicts an initial state of the TCAM table. The TCAM table is populated with multiple rule conditions. Illustratively, a bold rectangle highlights four positions in the TCAM table. The two uppermost positions in the bold rectangle represent two rules that are to be replaced with new rules. The two bottommost positions are empty slots in the TCAM table. Box 902 depicts the TCAM table after inserting the two new rules in the empty slots. Note, the version bit of each of the new rules differs from the other rules listed in the TCAM table and also the current version bit of the configuration register. In effect, the new rules added to the TCAM table are inactive, thus preventing any conflict with the current rules to be replaced. Box 903 depicts the TCAM table after setting the version bit of each of the rules not to be replaced to a wildcard bit. Box 904 depicts the TCAM table after setting the current version bit in the configuration register to 1. After the current version bit is set to 1, the new rules added to the TCAM table become active, and the rules to be replaced become inactive. Box 905 depicts the TCAM table after the controller has removed the rules to be replaced. Box 906 depicts the TCAM table after the new rules have been placed in the position of the rules that were removed. Further, Box 906 depicts the TCAM table after the version bit of each of the remaining rules have been set to be identical to the current version bit.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for atomically updating an access control list stored in a ternary content addressable memory (TCAM), the method comprising:
  receiving an update to apply to the access control list;
  identifying a first group of entries in the TCAM using an active version bit, wherein each entry in the first group has a ternary flag has a value matching a current value of the active version bit and wherein the ternary flag value indicates one of matching, not matching, or always matching the active version bit;
  updating the ternary flag value of one or more entries in the TCAM to define a second group of entries, wherein each entry in the second group of entries has ternary flag value of either not matching or always matching; and atomically performing the update by inverting the value of the active version bit.

2. The method of claim 1, further comprising, updating the ternary flag in each TCAM entry of the second group to match the inverted value of the active version bit.

3. The method of claim 1, wherein the update inserts one or more entries in the TCAM and wherein updating the ternary flag of the one or more entries comprises:

inserting one or more entries in the TCAM, wherein the ternary flag of each inserted entry has a value that does not match the value of the active version bit; and setting the ternary flag value of each entry in the first rule group to always matching; and upon the active version bit being inverted, setting the ternary flag value of each entry in the first rule group to matching.

4. The method of claim 1, wherein the update deletes one or more entries from the first group and wherein updating the ternary flag of the one or more entries comprises:

identifying at least a first entry to be deleted from the first group;

setting the ternary flag value of each of the rules other than the first entry to always matching; and upon the active version bit being inverted, setting the ternary flag value of each of the rules other than the first entry to matching.

5. The method of claim 3, further comprising, inverting a validity bit in the at least the first rule.

6. The method of claim 1, wherein the update replaces one or more entries of the first group and wherein updating the ternary flag of the one or more entries comprises:

identifying at least a first entry in the first group to replace;

inserting at least one replacement entry in the TCAM, wherein the at least one replacement entry has a ternary flag with a value that does not match the value of the active version bit;

setting the ternary flag of each entry in the first group other than the first entry to always matching; and upon the active version bit being inverted, setting the ternary flag value of each of the rules other than the first entry to matching.

7. The method of claim 1, wherein the access control list specifies conditions for processing a frame according to a rule and actions for managing incoming network frames in a distributed networking switch.

* * * * *